US011563815B2

(12) United States Patent
Shetty

(10) Patent No.: US 11,563,815 B2
(45) Date of Patent: Jan. 24, 2023

(54) SESSION PASSING BETWEEN SMART DEVICES

(71) Applicant: VMWARE, INC., Palo ALto, CA (US)

(72) Inventor: Rohit Pradeep Shetty, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/194,346

(22) Filed: Mar. 8, 2021

(65) Prior Publication Data

US 2022/0232084 A1 Jul. 21, 2022

(30) Foreign Application Priority Data

Jan. 20, 2021 (IN) .............................. 202141002675

(51) Int. Cl.
*H04L 67/148* (2022.01)
*H04L 12/28* (2006.01)

(52) U.S. Cl.
CPC .......... *H04L 67/148* (2013.01); *H04L 12/282* (2013.01); *H04L 2012/2841* (2013.01); *H04L 2012/2849* (2013.01)

(58) Field of Classification Search
CPC ................. H04L 67/148; H04L 12/282; H04L 2012/2849; H04L 2012/2841
See application file for complete search history.

(56) References Cited

U.S. PATENT DOCUMENTS

| 9,491,033 | B1* | 11/2016 | Soyannwo | H04W 4/023 |
| 9,774,824 | B1* | 9/2017 | Brady | H04W 4/021 |
| 10,501,267 | B1* | 12/2019 | Chinoy | G06V 20/52 |
| 2005/0144288 | A1* | 6/2005 | Liao | H04L 63/145 709/227 |
| 2013/0074002 | A1* | 3/2013 | Markovic | G06F 3/011 715/781 |
| 2013/0145420 | A1* | 6/2013 | Ting | H04L 63/08 726/1 |
| 2013/0262857 | A1* | 10/2013 | Neuman | H04L 63/083 713/155 |
| 2013/0342637 | A1* | 12/2013 | Felkai | H04L 69/24 348/14.08 |

(Continued)

FOREIGN PATENT DOCUMENTS

CN 110535732 B * 12/2021 ......... G06K 9/00228

*Primary Examiner* — John A Follansbee
*Assistant Examiner* — Kamal M Hossain
(74) *Attorney, Agent, or Firm* — Clayton, McKay & Bailey, PC

(57) ABSTRACT

Systems and methods are described for passing a session between smart devices. A user can initiate a session on a first smart device. The first smart device can detect the user exiting a detection area associated with the first smart device. The first smart device can pause the session and notify a server. The server can instruct a device of the user to listen for a device identifier of a second smart device. The second smart device can detect the user entering a detection area and broadcast a device identifier. The user device can receive the device identifier and send it to the server. The server can verify the device identifier and send a credential to the user device. The user device can send the credential to the second smart device. The second smart device can authenticate with the server using the credential. The second smart device can then continue the session.

20 Claims, 7 Drawing Sheets

(56) References Cited

U.S. PATENT DOCUMENTS

| | | | | |
|---|---|---|---|---|
| 2015/0024745 A1* | 1/2015 | Zhou | H04W 8/005 | |
| | | | 455/434 | |
| 2015/0304433 A1* | 10/2015 | Xiao | H04L 67/148 | |
| | | | 709/203 | |
| 2015/0381740 A1* | 12/2015 | Gwin | H04W 12/068 | |
| | | | 709/228 | |
| 2016/0057139 A1* | 2/2016 | McDonough | H04L 67/141 | |
| | | | 726/6 | |
| 2016/0198304 A1* | 7/2016 | Oh | H04W 4/023 | |
| | | | 455/41.3 | |
| 2016/0210097 A1* | 7/2016 | Forutanpour | G06F 3/1423 | |
| 2016/0232515 A1* | 8/2016 | Jhas | G06Q 20/3278 | |
| 2018/0343309 A1* | 11/2018 | Mishra | H04L 63/0861 | |
| 2020/0092291 A1* | 3/2020 | Vempati | H04L 63/08 | |
| 2020/0126565 A1* | 4/2020 | Kim | G10L 17/00 | |
| 2020/0387904 A1* | 12/2020 | Gosalia | G06Q 20/4014 | |
| 2021/0058505 A1* | 2/2021 | Gorsica | H04R 5/04 | |

* cited by examiner

SESSION PASSING BETWEEN SMART DEVICES

RELATED APPLICATIONS

Benefit is claimed under 35 U.S.C. 119(a)-(d) to Foreign Application Serial No. 202141002675 filed in India entitled "SESSION PASSING BETWEEN SMART DEVICES", on Jan. 20, 2021, by VMware, Inc., which is herein incorporated in its entirety by reference for all purposes.

BACKGROUND

Smart devices that are context aware are becoming more and more ubiquitous as time passes. Context aware can mean that the device can autonomously perform certain functions with or without direct user input. Homes, businesses, and even automobiles are seeing a rise in smart devices with virtual assistants that can execute tasks based on user actions or voice commands, such as playing music, providing directions to a location, providing a weather forecast, and reading emails.

One major shortcoming with these smart devices is the ability to pass tasks from one to another, such as for following a user without the need for user intervention. For example, when a user moves from a first room with a smart device to a second room, the user must command one of the smart devices to transfer the task. Otherwise the task will continue on the smart device in the first room despite the user no longer being present.

Not only is this inconvenient, but it also poses a security risk for companies, like enterprises, where the task involves sensitive information. For example, a user can instruct a smart device to begin reading his emails. If the user leaves the area of the smart device, the smart device continues reading the emails aloud. This can expose potentially sensitive information from the emails to any nonauthorized people that come into the area.

As a result, a need exists for methods for securely passing smart device sessions between smart devices without user intervention.

SUMMARY

Examples described herein include systems and methods for transferring a session between smart devices. In an example, a first smart device can initialize a session based on a user command. A session can be a period in which a smart device is dedicated to executing tasks for a particular user profile. Examples of tasks can include streaming audio or video, reading an email, reciting calendar events, and answering a question from a user. The first smart device can track the user within its detection area while executing the task.

In an example, where the user exits the first smart device's detection area while the first smart device is executing the task, the first smart device can notify a server. In one example, the first smart device can pause the session. In another example, the notification can include session details and a user ID associated with a user profile of the user. The server can receive the notification and send instructions to a user device of the user to listen for a device identifier ("ID"). In an example, the user can enter a detection area of a second smart device. The second smart device can begin broadcasting its device ID. The user device can detect the device ID and record it.

In an example, the user device can send the device ID to the server. The server can verify that the second smart device is registered to the user's profile. The server can generate a credential and send it to the user device. The user device can send the credential to the second smart device. In one example, the second smart device can authenticate with the server using the credential, and the server can send session details to the second smart device. The second smart device can use the session details to continue the session. In another example, the server can send the credential to a second server associated with the task being executed in the session. The second smart device can authenticate with the task server using the credential and provide the session details to the task server. The task server can then begin providing data to the second smart device so that the second smart device can continue the session.

In an example, instead of sending the device ID to the server, the user device can exchange credentials with the second smart device. The second smart device can use the credentials to verify that the user that entered its detection area is the same user that exited the detection area of the first smart device. The second smart device can then retrieve the session details from the first smart device and contact the server, or task server, to continue the session.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for passing a session between smart devices. A user can initiate a session on a first smart device. The first smart device can detect the user exiting a detection area associated with the first smart device. The first smart device can pause the session and notify a server. The server can instruct a device of the user to listen for a device identifier of a second smart device. The second smart device can detect the user entering a detection area and broadcast a device identifier. The user device can receive the device identifier and send it to the server. The server can verify the device identifier and send a credential to the user device. The user device can send the credential to the second smart device. The second smart device can authenticate with the server using the credential. The second smart device can then continue the session.

Figure 1:
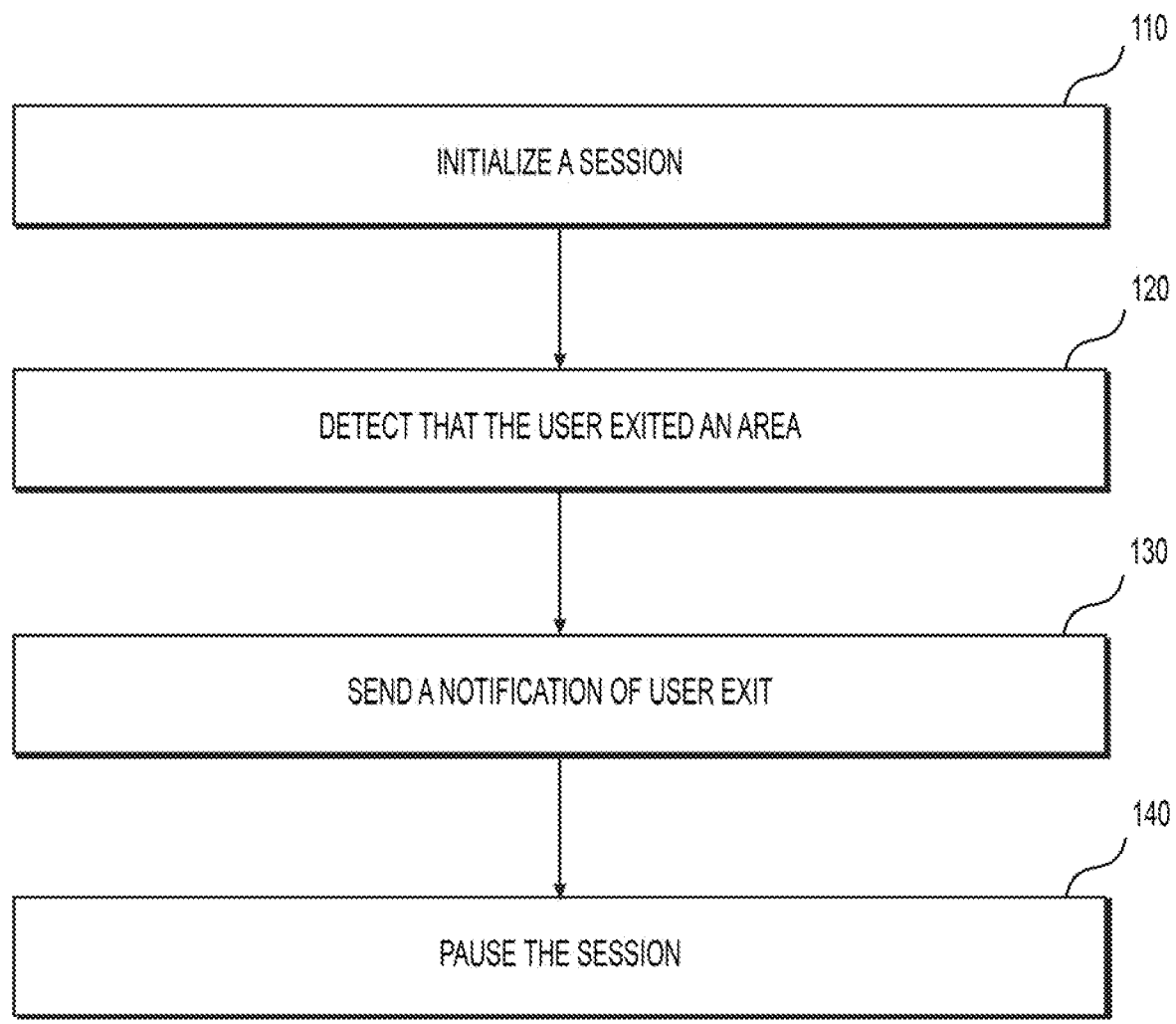
FIG. 1 is a flowchart of an example method for passing a session between smart devices.
Figure 2:
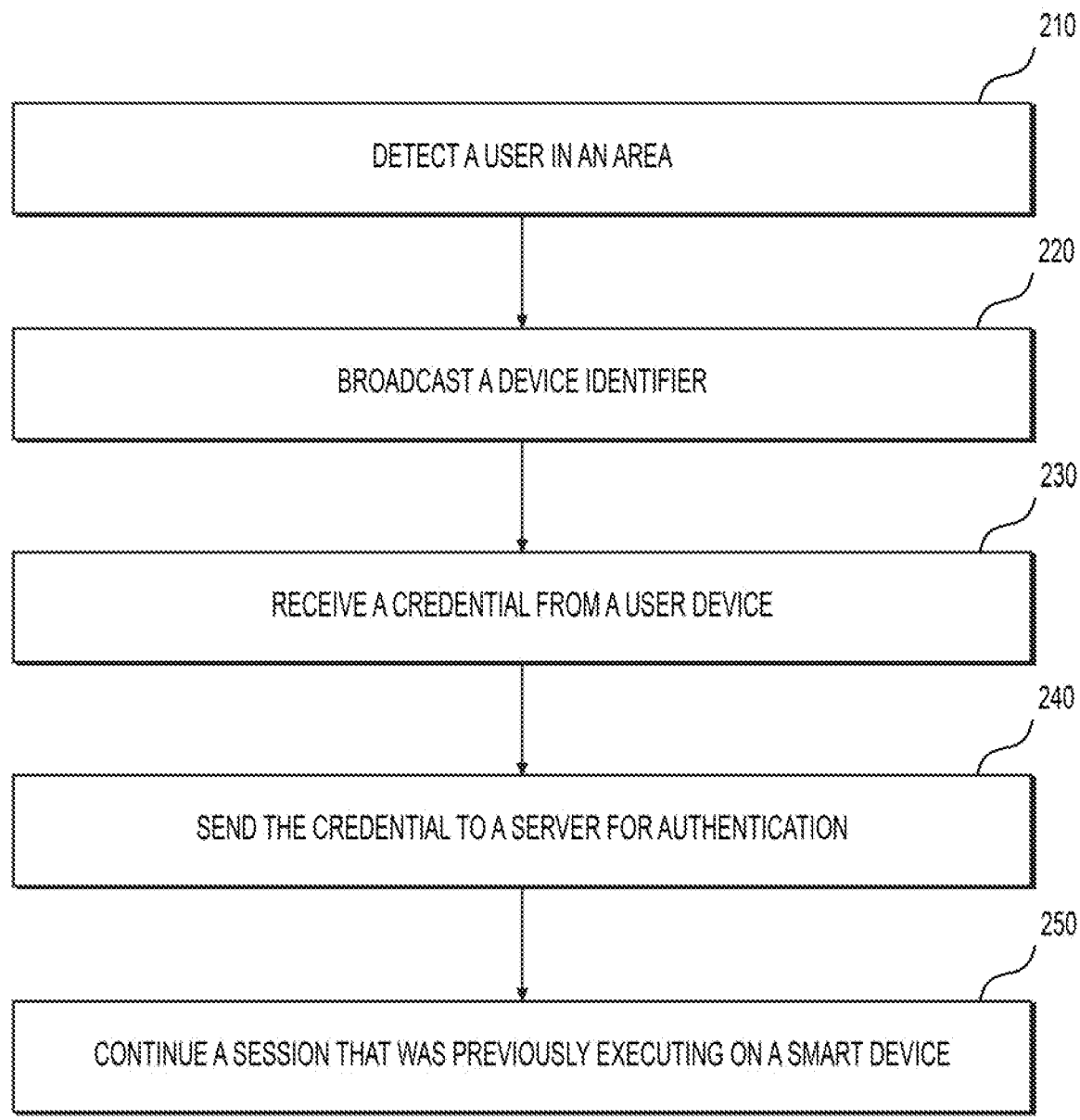
FIG. 2 is another flowchart of an example method for passing a session between smart devices.
Figure 3:
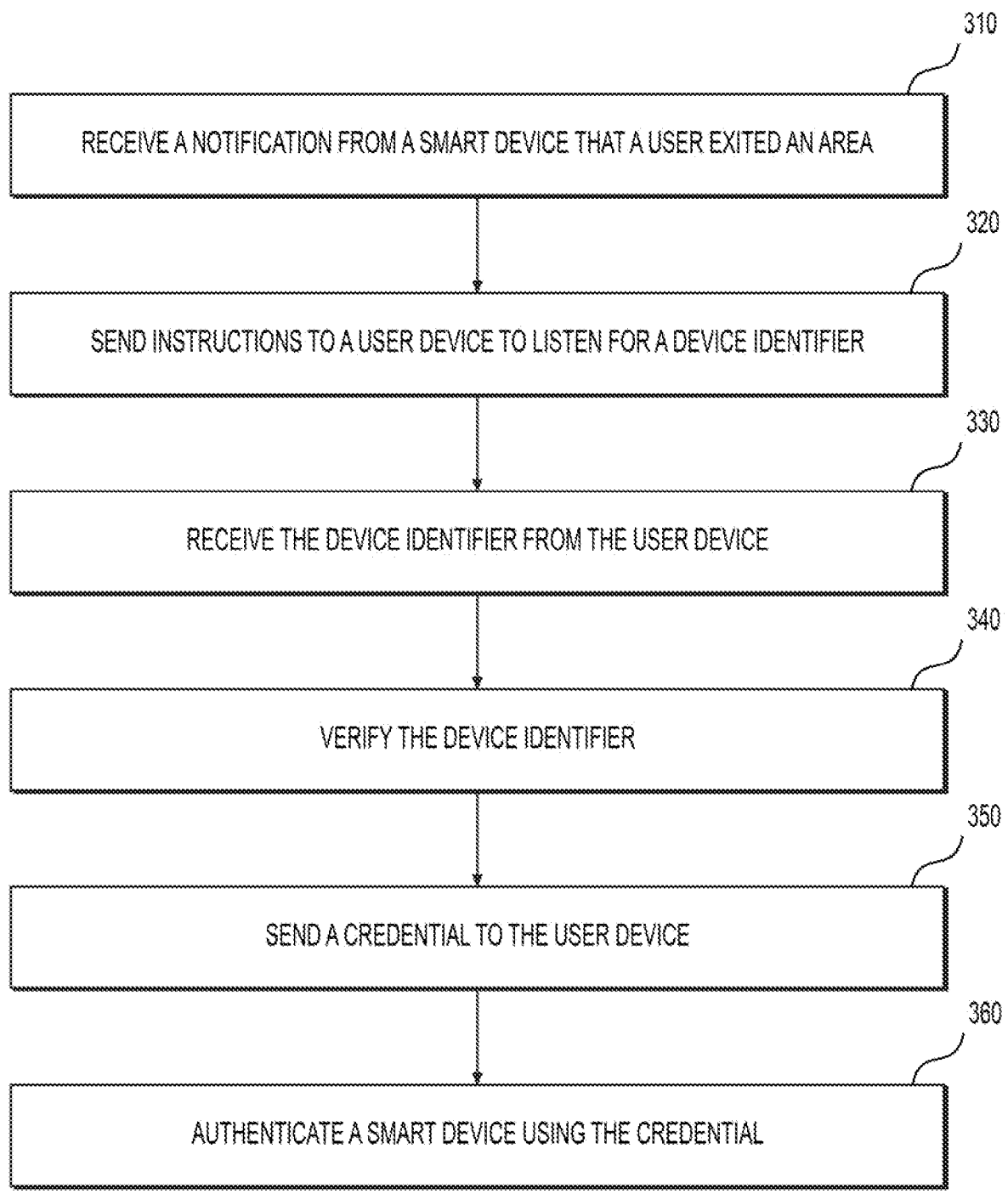
FIG. 3 is another flowchart of an example method for passing a session between smart devices.
Figure 4:
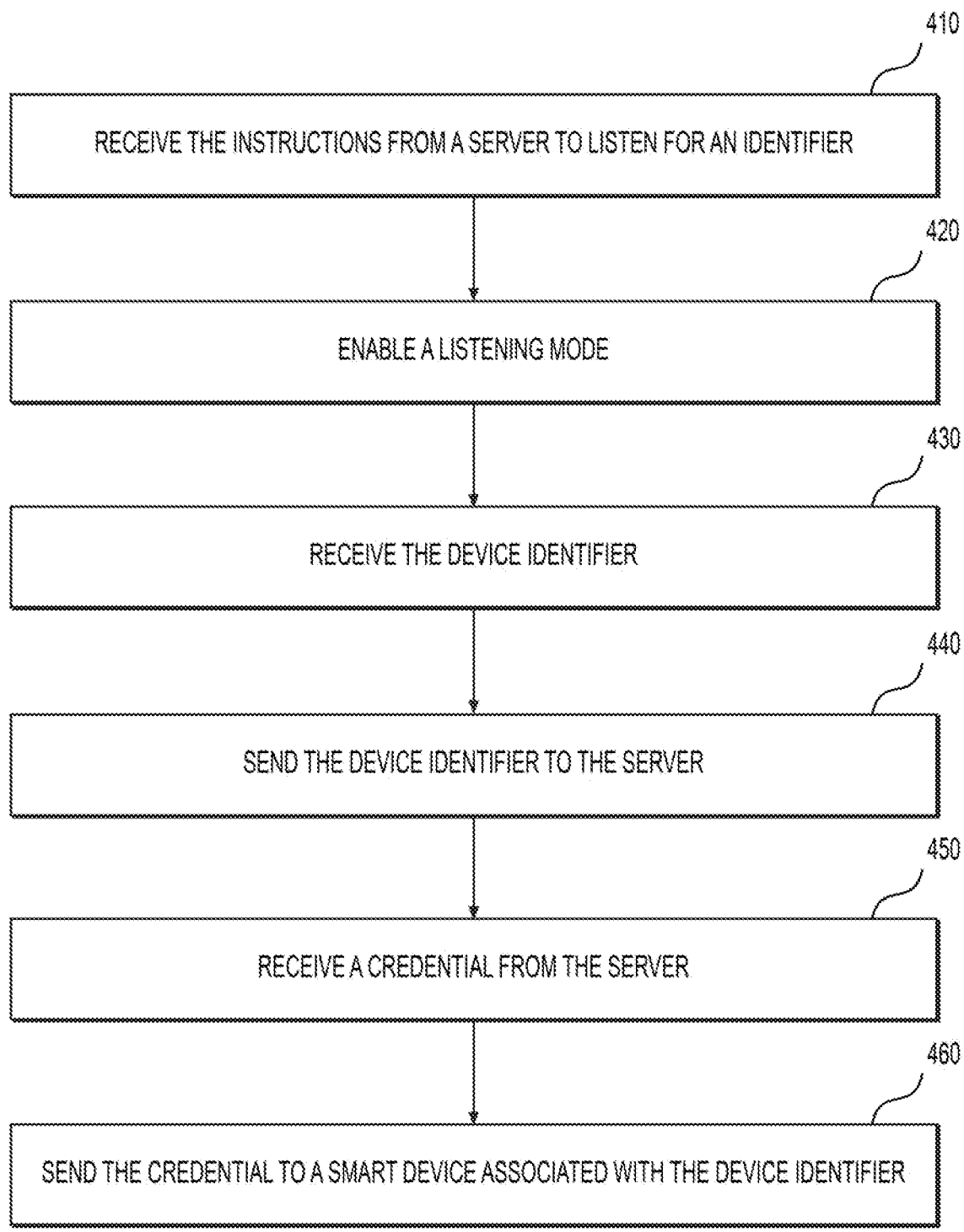
FIG. 4 is another flowchart of an example method for passing a session between smart devices.

FIGS. 1-4 are flowcharts of example methods for different components that can be included in passing a session between smart speaker. FIG. 1 illustrates an example of stages that can be performed by a smart user device that transfers the session, hereinafter referred to as "Smart Device A." FIG. 2, illustrates an example of stages that can be performed by a smart device that receives the session hereinafter referred to as "Smart Device B." FIG. 3 illustrates an example of stages that can be performed by a server. FIG. 4 illustrates an example of stages that can be performed by a user device.

Figure 5:
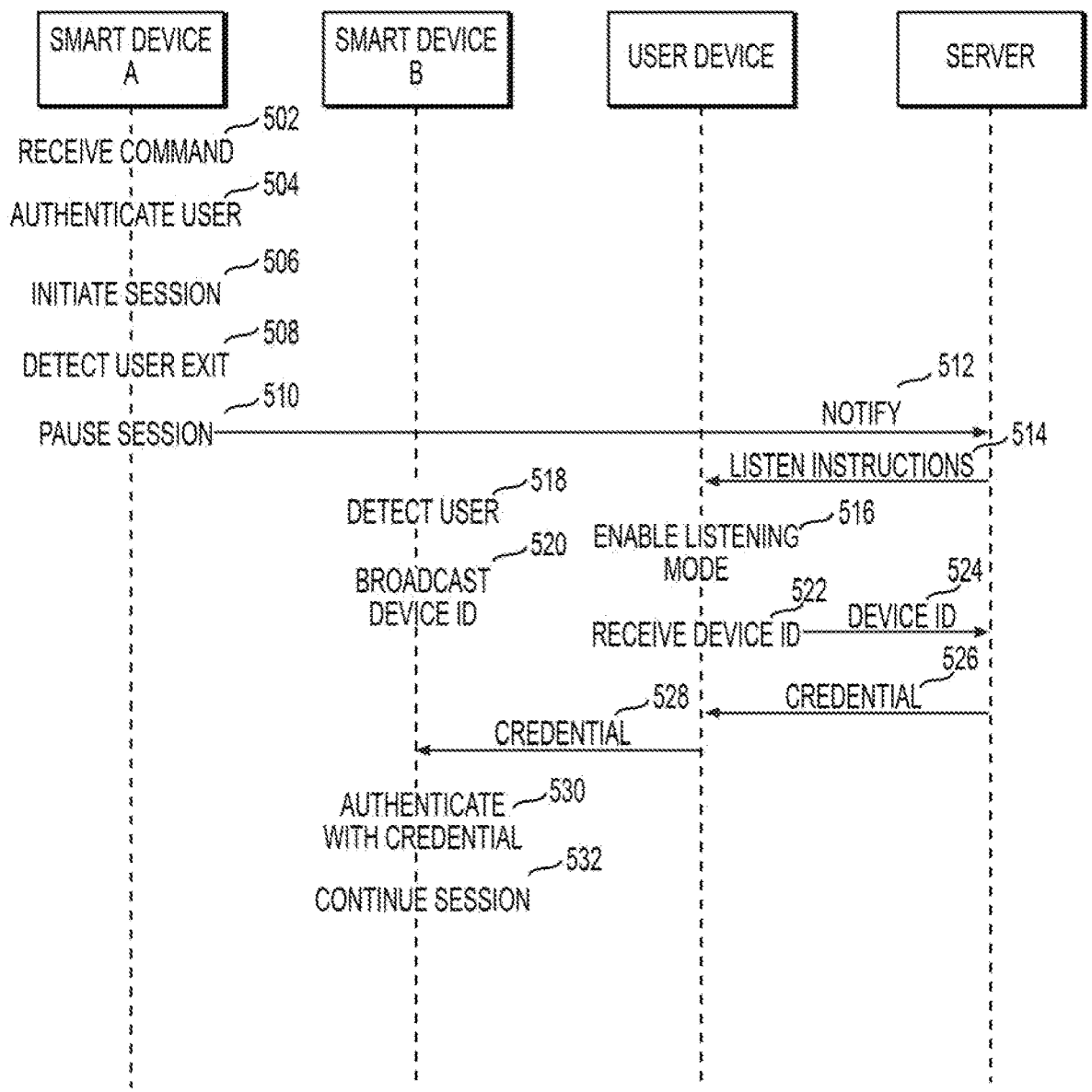
FIG. 5 is a sequence diagram of an example method for passing a session between smart devices.
Figure 6:
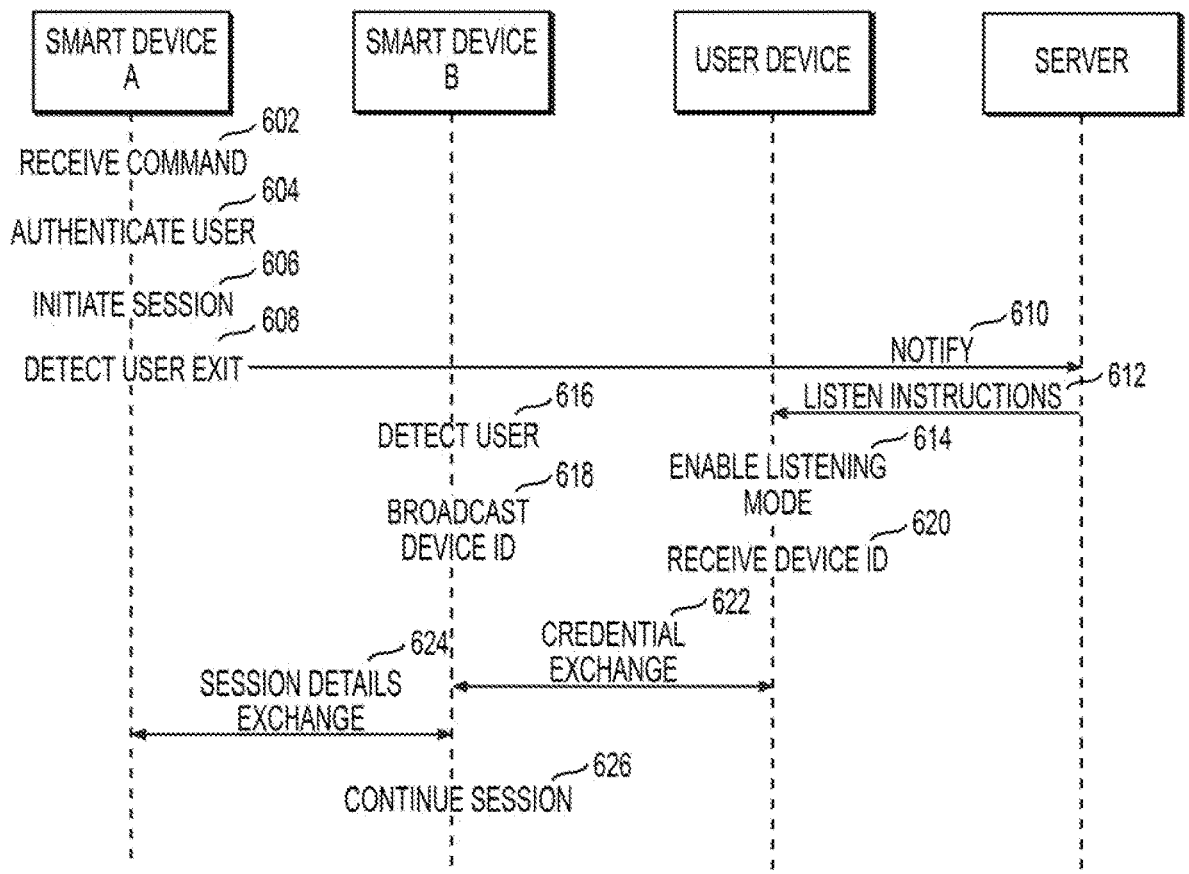
FIG. 6 is another sequence diagram of an example method for passing a session between smart devices.
Figure 7:
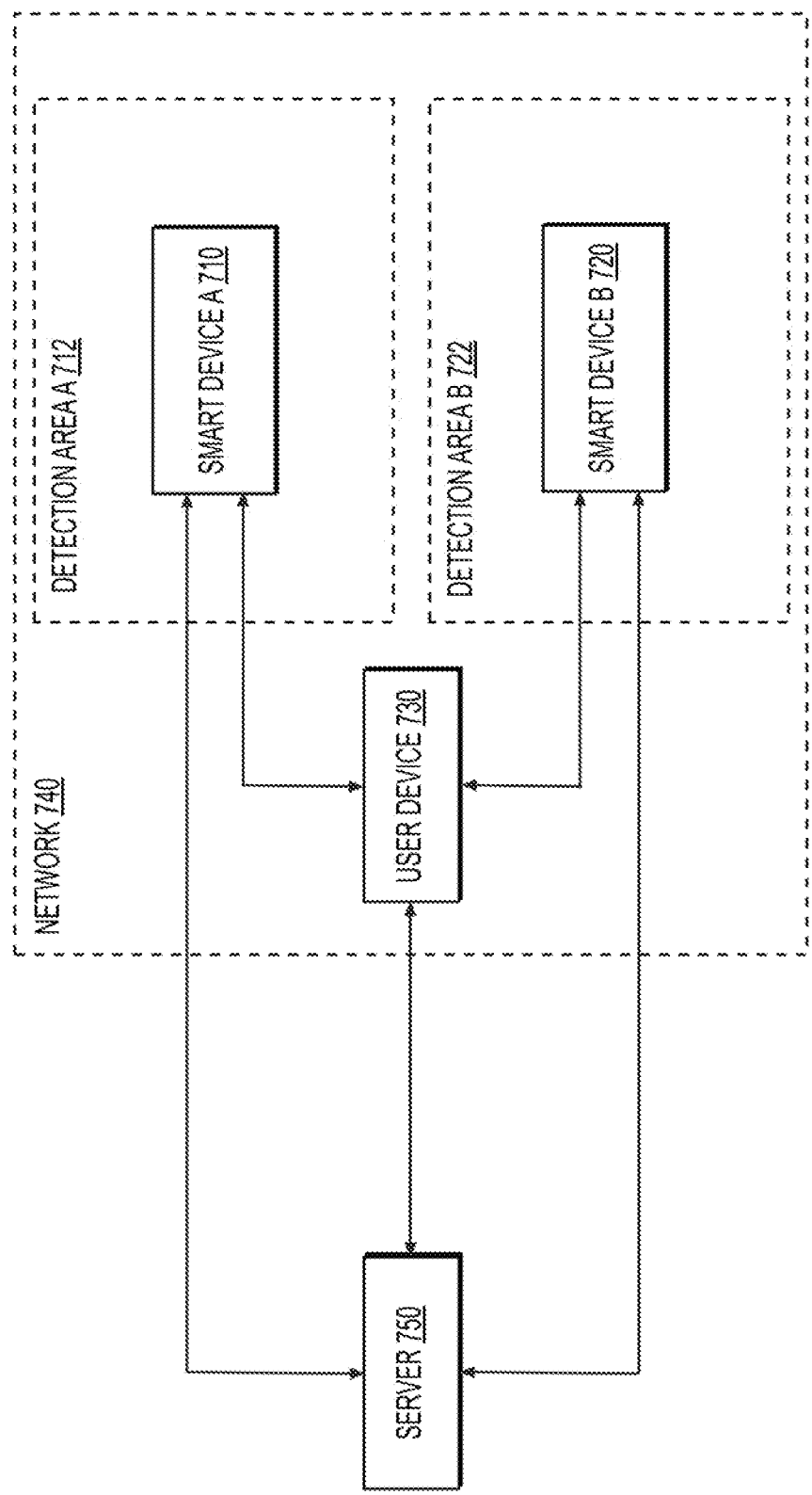
FIG. 7 is an illustration of an example system for passing a session between smart devices.

FIGS. 5 and 6 are sequence diagrams of example methods for passing a session between smart devices that includes a smart device that transfers the session, a smart device that receives the session, a server that authorizes the transfer, and a user device that helps facilitate the transfer. FIG. 7 is an illustration of an example system diagram for passing sessions between smart devices.

Moving to FIG. 1, at stage 110, Smart Device A can initialize a session. Smart Device A can be an electronic device that is context aware and can autonomously perform certain functions without direct user input. Context aware can mean that the device can gather information about its environment and adapt its behaviors accordingly. As some examples, the Smart Device A can be a smart speaker or smart display, such as GOOGLE HOME, GOOGLE NEST HUB, AMAZON ECHO, AMAZON ECHO SHOW. Smart Device A can also have detection capabilities. For example, the Smart Device A can use motion sensors, a video camera, or radar to detect the presence of a person in its vicinity. The area in which Smart Device A can detect a person can be its detection area.

A session can be a period in which a smart device is dedicated to executing tasks for a particular user profile. Examples of tasks can include streaming audio or video, reading an email, reciting calendar events, and answering a question from a user. In an example, a session can be dedicated to a particular user. For example, some smart devices can allow for multiple user profiles. When a user issues a command for the smart device to execute a task, the smart device can verify the user and initiate a session under the user's profile. The session can include one or multiple tasks for the user profile.

In one example, Smart Device A can initiate the session in response to user input. As an example, Smart Device A can include an intelligent virtual assistant, such as GOOGLE PERSONAL ASSISTANT or AMAZON ALEXA, that allows Smart Device A to perform tasks based on commands or questions from a user. In an example, Smart Device A can be configured to listen for a command or question when a user says a trigger word. The user can say the trigger word and then say the command or question for Smart Device A. Smart Device A can hear the command or question, interpret it, and then initiate a session performing the requested task. In another example, a user can begin a task on the user device, and, using a feature on the user device, transfer the session to Smart Device A. As an example, the user can begin playing a song on a song application on the user device. The song application can include a button that a user can select to transfer the song to another device. The user can select the button and choose Smart Device A. The user device can then transfer the session accordingly.

In one example, Smart Device A can authenticate the user. Smart devices are capable of running multiple applications and of having multiple user profiles registered for each application. Smart Device A can authenticate the user to determine which user profile to run the application under. In an example where the user speaks a command to initiate the session, Smart Device A can use voice recognition to verify the user. In another example, the user can initiate the session on a user device and transfer the session to Smart Device A using an interface on the user device. The interface can be an application or a feature of an application that allows a user to transfer a session to another device. In another example, Smart Device A can use facial recognition to detect the user's face and identify the user. In still another example, Smart Device A can use a combination of methods to verify the user.

In an example, Smart Device A can determine an identifier ("ID") of the user. In one example, Smart Device A can match the user's voice or image to a user profile of the user. In another example, the user can log into an application on the user device using credentials for the user profile. Where the user transfers the session to Smart Device A from the user device, the user device can send an ID of the user profile.

At stage 120, Smart Device A can detect that the user exited a detection area. For example, Smart Device A can use motion or person detection capabilities to track a user and detect when the user leaves a detection area. In an example, the detection area can be the trackable area for Smart Device A. In one example, Smart Device A can track a user moving out of range of its detection capabilities. In another example, the Smart Device A can define an imaginary border, such as a geofence, and Smart Device A can detect when the user crosses the geofence. In still another example, the Smart Device A can detect a user exiting the area where it is unable to detect the user's presence for a predetermined amount of time.

The detection can be based on the presence of a user device associated with the user, in an example. For example, a user device discoverable by a near-field BLUETOOTH transmission can be considered within the area. When the user device becomes undetectable it can be tracked as leaving the detection area. Alternatively, a smart device can rely on motion and sound detection to determine when the user has left the detection area. In one example, the smart device can listen for levels of ultrasonic sound transmitted from the user device or vice versa to determine the user's presence.

In still another example, Smart Device A and the user device can maintain presence based on periodic ultrasound pulses or BLE. Therefore, when the user walks away from Smart Device A, this periodic polling can be broken, causing either Smart Device A or the user device to indicate to the server to pause the session. This alternate method could be particularly useful if Smart Device A does not have advanced user detection capabilities like motion sensors, camera, or radar. The rest of the example stages can remain similar, with Smart Device B either detecting user presence through motion sensors or with the server or user device activating Smart Device B through Ultrasound.

In an example, Smart Device B can be a smart device like Smart Device A, but they need not be identical. For example, Smart Device A can be a smart speaker and Smart Device B can be a smart display. In one example, Smart Device A and Smart Device B can use different operating systems. For example, Smart Device A can use a GOOGLE ANDROID-based operating system and Smart Device B can run an operating system based on AMAZON ALEXA.

At stage 130, Smart Device A can send a notification that the user exited the detection area. In an example, Smart Device A can notify a server. In one example, the server can be a management server that is responsible for session hand offs. In another example, the server can be a server that manages the particular task of the session. Servers are described in greater detail later herein regarding FIG. 3. In an example, Smart Device A can notify the server, and the server can manage the session transfer from that point. In one example, Smart Device A can also send the user ID to the server.

In another example, Smart Devices A and B can be connected to the same network and communicate user locations and sessions statuses with each other directly. As an example, a user can initiate a session on Smart Device A. When Smart Device A detects the user leaving its detection area, it can notify other smart devices on the network, such as with a network broadcast. In one example, the broadcast can include the user's ID. Smart Device B can detect the user enter its detection area and notify Smart Device A. Smart Device B can verify that the detected user is the same user that started the session on Smart Device A by connecting to the user device and verifying the user ID. Smart Devices A and B can sync details about the session, such as the task being executed and at what point during the task execution that the user device exited the detection area. Smart Device B can then continue the session.

At stage 140, Smart Device A can pause the session. In one example, Smart Device A can pause the session in response to the user exiting the detection area. In another example, Smart Device A can wait a predetermined amount of time after the user exits before pausing the session. In yet another example, Smart Device A can continue the session until it receives a notification that the session has been continued on another smart device. As an example, as described later herein, Smart Device B can detect the user enter its detection area and activate the session. In one example, Smart Device B can notify a server that it activated the session, and the server notify Smart Device A. In another example where Smart Devices A and B are on the same network, Smart Device B can notify Smart Device A directly.

In some examples, the type of handoff used can depend on the task executing in the session. As an example, where the session task involves broadcasting sensitive information, Smart Device A can pause the session as soon as the user exits the detection area or when it is unable to detect the user for a predetermined amount of time. The session can remain paused until the user reenters the detection area or Smart Device B resumes the session. In one example, sensitive tasks can require authentication at Smart Device B before Smart Device B can resume the session, which is described in more detail later herein.

Where a session task does not involve sensitive information, Smart Device A can continue the session even when the user exits the detection area. For example, Smart Device A can begin a timer when the user exits the detection area. The timer can allow time for the session to be picked up by another smart device before Smart Device A stops the session. For example, Smart Device B can detect the user and connect to Smart Device A to sync the session while Smart Device A is still executing the session task. Smart Devices A and B can communicate so that Smart Device B begins executing the task and Smart Device A stops executing the task on or about the same time. If a predetermined amount of time passes where the user does not reappear and no notification is received that the session has been continued on another device, Smart Device A can pause or terminate the session.

In an example of the above described method, a user can request that Smart Device A perform a certain task, like playing music or reading emails. Smart Device A can begin a session for the user and begin executing the task. The user can exit the detection area of Smart Device A can and enter the detection area of Smart Device B. Smart Device A can detect the user exiting its detection area and send a notification of the user's exit. In one example, Smart Device A can send the notification to a server and pause the session. In another example, Smart Device A can notify other smart devices on the same network. In yet another example, Smart Device A can continue the session until a predetermined amount of time passes or it receives a notification that the user entered the detection area of Smart Device B. Smart Device A can communicate with Smart Device B to sync the session and stop executing the task as Smart Device B begins doing so.

Moving to FIG. 2, at stage 210, Smart Device B can detect a user in a detection area. For example, Smart Device B can use motion or person detection capabilities to detect when the user enters its detection area. In one example, Smart Device B can detect movement with a motion sensor, and in response Smart Device B can initialize other detection functionality to determine whether a person is in its detection area, such as with radar or a video camera.

In one example, the presence of the user can be further verified by the server. If the Smart Device B has the appropriate sensors or camera, the server can attempt to match physical characteristics of the user to confirm the user's presence. Smart Device B can send observed characteristics, such as the user's height and predicted weight. The same characteristics may have been reported previously to the server by Smart Device A. The server can perform a comparison of the stored physical characteristics data from both Smart Devices A and B before allowing the session transfer from Smart Device A to Smart Device B.

At stage 220, Smart Device B can broadcast its device ID. The device ID can be a unique identifier for a device. As some examples, the device ID can be an International Mobile Equipment Identity ("IMEI") number, a media access control ("MAC") address, or a serial and model number combination.

In one example, Smart Device B can broadcast the device ID as audio using ultrasound or infrasound waves. In another example, Smart Device B can connect to the user device using wireless communication protocols, such as WI-FI, BLUETOOTH, or BLE. The user device can be in a listening mode where it can receive the audio and record the device ID. In an example, the user device can activate the listening mode in response to instructions from the server. For example, upon detecting that the user exited its detection area, Smart Device A can notify the server, and the server in turn can instruct the user device to activate the listening mode. In one example, the user device enables audio listening based on being within a geofence, the audio being interrupted in the last few minutes within the same ecosystem, and the user now being stationary. For example, the user device can detect a lack of user movement, such as with an accelerometer sensor. This can indicate that the user has settled in a new location.

In an example, Smart Device B and the user device can exchange credentials. In one example, the credentials can include device IDs. Smart Device B can check with the server to verify that the device ID of the user ID is registered for the user. In one example, the user device can also provide authentication credentials, such as a certificate.

In an example, the user device can receive the device ID and exchange credentials with Smart Device B. As an example, the user device can send a certificate with a public key to Smart Device B that identifies the user device. Smart Device B can decrypt the certificate using a private key to verify the user device. A credential exchange can be used to verify that the user that entered the detection area of Smart Device B is the same user that left the detection area of Smart Device A.

At stage 230, Smart Device B can receive a credential from the user device. In an example, this credential can be provided to the user device by the server. For example, the user device can send the device ID to the server. The server can authenticate the user device and verify that Smart Device B is authorized the receive the session based on the device ID. The server can retrieve or generate a credential for the Smart Device B and send it to the user device. In an example, the credential can be a one-time password ("OTP"). An OTP can be a password or pin that is only valid for one session or transaction. The user device can send the credential to Smart Device B. In one example, where the user device has the capability, it can send the credential as audio using infrasound or ultrasound waves. In another example, the user device can connect to Smart Device B and send the credential using a wireless communication protocol, such as WI-FI, BLUETOOTH, or BLUETOOTH LOW ENERGY ("BLE").

At stage 240, Smart Device B can send the credential to the server for authentication. In an example, Smart Device B can send a network address of the server when it sends the credential. Smart Device B can use the network address to connect to the server and send the credential. The server can receive the credential and authenticate Smart Device B.

In one example, the server can also send information for continuing the session, such as the task being executed in the session, the application executing the task, and where to continue the task. For example, where the task involves reading an email, the information can include a smart device application that accesses the user's email, the email being read, and where in the email Smart Device A stopped reading.

In an example, the Smart Device B can send the credential to a server associated with the task being executed in the session. For example, where the task is a music application playing a music track, Smart Device B can send the credential to a server for the music application. In such an example, the server can send the OTP to the music application server, which the music application server can then use to authenticate Smart Device B.

At stage 250, Smart Device B can continue a session that was previously executing on another smart device. For example, Smart Device B can continue the session from Smart Device A. In one example, the Smart Device A can hand the session off to Smart Device B directly. For example, Smart Device B can exchange credentials with the user device to verify that the user device belongs to the user that initiated the session on Smart Device A. When the user leaves the detection area of Smart Device A, Smart Device A can send the user ID to the server. In an alternate example, Smart Device A can send a broadcast to smart devices on the same network that the user exited its detection area, and the broadcast can include the user ID. Smart Device B can receive the user ID and detect a user in its detection area. Smart Device B can connect to the user device and to verify the user. Smart Device B can communicate with Smart Device A to sync information about the session, and Smart Device B can continue the session.

In one example of the method described above, Smart Device B can detect a user in its detection area. Smart Device B can broadcast its device ID for a predetermined amount of time. The user device can detect the broadcast and record the device ID. The user device can send the device ID to the server, which can verify that Smart Device B is permitted to continue the session. The server can send a credential to the user device, which the user device can send to Smart Device B. Smart Device B can then authenticate with the server using the credential. In one example, the server can provide Smart Device B with the details for continuing the session. In another example, Smart Device B can retrieve the details from Smart Device A.

Some applications may not require server authentication for session transfers. In one such example of the method described above, upon detecting the user in its detection area, Smart Device B can connect to the user device can initiate a credential exchange. The user device and Smart Device B can exchange credentials to confirm that the user that entered the detection area is the user that initiated the session. Upon verifying the user device, Smart Device B can communicate with Smart Device A to sync details about the session and execute the session transfer.

Moving to FIG. 3, at stage 310, the server can receive a notification from Smart Device A that a user exited a detection area. The server can be a single server or a group of servers, including multiple servers implemented virtually across multiple computing platforms. In one example, the server can be an application or management server for the task being executed in the session. In another example, the server can be a management server that can handles session transfers between smart devices for multiple services.

In an example, a user can initiate a session on Smart Device A. The session can be linked to a user ID of the user. When the user exits the detection area of Smart Device A, Smart Device A can send a notification to the server. In one example, the notification can include information about the user and the session. For example, the notification can include the user ID, the task being performed in the session, and the where the task was paused when the user exited.

At stage 320, the server can send instructions to a user device to listen for a device ID. In an example, the server can use the user ID to identify user devices associated with the user. In one example, the server can check location information, such as Global Positioning System ("GPS") or other location information provided by each user device, to determine which user devices of the user are located near Smart Device A. The server can send instructions to those devices located near Smart Device A to enter a listening mode. The listening mode can ready the user device to detect and receive data from a smart device.

At stage 330, the server can receive the device ID from the user device. In an example, the device ID can be associated with Smart Device B. For example, Smart Device B can detect the user entering its detection area and begin broadcasting its device ID. The user device can detect the broadcast, record the device ID, and send it to the server.

At stage 340, the server can verify the device ID. In an example, the server can store, or have access to a database that stores, a registry of devices approved for receiving the session. In one example, the registry can include a table that maps each smart device's ID to each user ID registered to it. As an example, when installing a new smart device on a network, a user can register the device with his or her account. Subsequent users can also register their accounts on the smart device. In an example, the user device can send its ID to the server when it sends the device ID of Smart Device B. The server can use both IDs to verify that Smart Device B is authorized to continue the user's session.

At stage 350, the server can send a credential to the user device. In an example, the credential can be an OTP. In an example, the user device can receive the OTP and send it to Smart Device B. In one example, the server can also send information for continuing the session.

At stage 360, the server can authenticate Smart Device B using the credential. In an example, the server can send the credential to the user device. The user device can send the credential to Smart Device B, and Smart Device B can send the credential to the server for authentication. In one example, the server in stage 360 can be a server for the task being executed in the session. For example, a management server can provide the credential for authenticating Smart Device B. The management server can send the credential to the user device and to the task server. The user device can send the credential to the user device, and the user device can authenticate with the task server using the credential.

In one example, the management server can send information for continuing the session to the user device, which the user device can forward to Smart Device B. Smart Device B can communicate this information with the task server so that the task server can provide data for continuing the session. As an example, the task can be streaming audio, and Smart Device A can stream the audio from a task server. When the user moves to the area of Smart Device B, the management server can send an OTP to the task server. The management server can send the OTP and information about audio stream to the user device, which can forward the information to Smart Device B. As an example, the audio stream information can include a network address for the task server, the audio being streamed, and where in the stream Smart Device B should continue. Smart Device B can connect to the task server using the network address and authenticate with the task server using the OTP. Smart Device B can also provide the audio stream information, and the task server can begin streaming audio to Smart Device B accordingly.

Moving to FIG. 4, at stage 410, the user device can receive the instructions from the server to listen for an identifier. The user device can be one or more processor-based devices, such as a cell phone, tablet, or smart watch. In an example, the instructions to listen for an identifier can include preparing to receive a device ID with one or more wireless communication methods. As an example, the instructions can include activating a microphone and recording audio, including audio of ultrasound and infrasound frequencies, opening a BLE channel, and listening for a device ID over WI-FI from another smart device on the name network.

In one example, the server makes some determination that the user has likely switched locations prior to causing the user device to listen for an identifier. For example, the server can verify the likely presence of the user in a new room. If the Smart Device B has the appropriate sensors or camera, the server can attempt to match physical characteristics of the user to confirm the user's presence. Smart Device B can send observed characteristics, such as the user's height and predicted weight. The same characteristics may have been reported previously to the server by Smart Device A. The server can perform a comparison of the stored physical characteristics data from both Smart Devices A and B before allowing the session transfer from Smart Device A to Smart Device B.

Also, the camera or other sensors on Smart Device B may also provide enough information for the server or smart device to detect user posture. For example, the posture of the user on entering the detection area can be examined, such as with a machine learning model, at either the Smart Device or the server. This posture can assist the server with deciding on initiating the automatic session transfer. For example, if the user is sitting, they are likely to remain in the location. But if the user is constantly on the move, this can indicate that they might just be temporarily looking for something. In the latter case, the server can defer initiating transfer of paused secure enterprise sessions until the user appears to have taken a more permanent position.

At stage 420, the user device can enable listening mode. For example, according to the instructions above, the user device can activate a microphone, open a BLE channel, or listen for another smart device on a WI-FI network. In one example, the user device can activate two or more of these methods. For example, the user device can activate a microphone and open a BLE channel. This can allow the user device to listen for a device ID using multiple methods in case Smart Device B does not have the functionality to broadcast its ID using one of the methods.

In one example, the user device enables listening mode only when criteria are met. This can help save battery life and prevent malicious attempts to hijack a session. For example, when the user is within the geofence of a defined ecosystem for smart device use, such as the user's home or at work, the listening mode can be applicable. From there, the user device can confirm (e.g., with the server) that the session has been interrupted recently (e.g., within two minutes) within that same geofenced ecosystem. Additionally, the user device can confirm that the user has stopped moving, which can be detected with sensors of the user device, such as an accelerometer. If the user has stopped moving, this can indicate that the user has settled into a location. As a result, the user device can then enable listening mode at stage 420.

At stage 430, the user device can receive the device identifier. In an example where the user device listens for audio with a microphone, Smart Device B can be configured to broadcast its device ID on a certain frequency, and the user device can listen for the user device on that frequency. In another example, Smart Device B can broadcast a piece of audio, such as a predetermined series of tones or sound pulses, with the device ID. The user device can listen for the series of tones to recognize the broadcast from Smart Device B, and can then record the device ID.

In another example, the user device can make itself available for receiving a device ID via a wireless communication protocol, such as WI-FI or BLE. In one example, the user device can receive the device ID as a broadcast from Smart Device B. Alternatively, the user device and Smart Device B can establish a connection and exchange information, such as the device IDs of one or both devices.

In one example, the user device can send the device ID to a second user device. For example, some smart devices connect directly to a parent device, such as with a BLUETOOTH connection and may not connect to a network. As an example, smart watches typically connect to a user's cell phone, but they do not always connect to a network. A user can walk into the detection area wearing a smart watch, but leave the parent device near Smart Device A. In such a situation, the smart watch can receive the device ID from Smart Device B and transfer the device ID to the parent device.

At stage 440, the user device can send the device ID to the server. In one example, the user device can authenticate with the server before sending the device ID. This can include providing the server with a user ID associated with the user device. For example, a user can log into the user device, or a management application on the device, with an account. The server can communicate with the management application to authenticate the device and receive the user ID and device ID. The server can verify that the device ID is registered to the user ID for the task being executed in the session.

At stage 450, the user device can receive a credential from the server. For example, after verifying that Smart Device B is authorized to continue the session, the server can provide an OTP for Smart Device B to send to Smart Device B. In one example, the server can also send the OTP to a server for the session task. In one example where the user device has a parent device, like the smart watch example described above, the server can send the credential to the parent device. The user device can then receive the credential from the parent device.

In one example, the user device can also receive information for continuing the session, such as such as the task being executed in the session, the application executing the task, and where to continue the task.

At stage 460, the user device can send the credential to Smart Device B. In an example, the user device can send the credential using the same method that it received the device ID. For example, where the user device receives the device ID from ultrasound or infrasound audio from Smart Device B, the user device can send the credential by emitting ultrasound or infrasound audio. The user device can do the same for other methods, such as BLE or WI-FI. In one example, the user device can also send information for continuing the task to Smart Device B.

In some examples of the methods described above, the task being executed in the session can be related to an enterprise. In one example, a user at home or in a public place can instruct a smart device to read aloud enterprise-related emails or documents. In another example, a smart device can be located at an enterprise location, and a user at the location can instruct the smart device to perform an enterprise-related task. In both examples, an enterprise may have a strong interest in restricting a broadcast of any enterprise data to when the user is located near the smart device.

In one such example, the Smart Devices A and B and the user device can include a management application. The management application can be a stand-alone application, part of an enterprise application, or part of an operating system of the user device or Smart Devices A and B. The management application can be part of an enterprise Unified Endpoint Management ("UEM") system that manages and secures devices that are enrolled with the enterprise. For example, the management application can be responsible for ensuring that devices are up to date with compliance and security settings prior to accessing enterprise data and resources. The server can be a management server that manages devices based on compliance and security settings. The server can provide compliance and security updates to the management application, and the management application can enforce compliance of the user device based on the compliance and security settings. For example, the management application can wipe enterprise data from the user device when compliance standards are not met. Some example compliance standards can include ensuring a device is not jailbroken, that particular encryption standards are used in enterprise data transmission, that the device does not have certain blacklisted applications installed or running, and that the device is located within a detection area when accessing certain enterprise resources.

In an example, when a user instructs Smart Device A to perform an enterprise-related task, the Smart Device A can hand off the request to its management application. The management application can act as a gatekeeper and verify the user before allowing the task to be executed. In one example, the management application can verify the user based on the user's voice matching a machine learning model trained to identify the user's voice. In another example, the management application can cause Smart Device A to connect to the management application on the user device and exchange credentials to verify the user. For example, Smart Device A can notify the server of the request, and the server can instruct the user device, through the user device's management application, to activate a listening mode. Smart Device A can broadcast its device ID, which the user device can receive. The user device can then connect to Smart Device A and exchange credentials. Smart Device A can then track the user while the user is in the detection area of Smart Device A.

In one example, where Smart Device A detects the user leaving the detection area of Smart Device A, the management application on Smart Device A can pause the session. In another example, the management application on Smart Device A can pause the session if Smart Device A cannot detect the user for a predetermined amount of time. If the user reappears in the detection, the management application can resume the session. In one example, the management application can cause Smart Device A to connect to the user device again to re-verify the user device before continuing the session. The management applications can also manage passing the session from Smart Device A to Smart Device B. For example, the management application on Smart Device A can notify the server when the user departs the detection area of Smart Device A. The server can send instructions to the management application on the user device to cause the user device to enter a listening mode. Upon detecting a user in its detection area, Smart Device B can broadcast its device ID. The user device can record the device ID, and the management application can send it to the server. The management application can handle authenticating the user device with the server, and the server can send a credential to the user device's management application. In one example, the management application can communicate with the management application of Smart Device B to provide the credential and session details. In another example, the server can use the device ID of Smart Device B to connect directly to Smart Device B to exchange session details. Where the session task involves a third-party server, the server can also provide a credential to the third-party server and Smart Device B so that Smart Device B can authenticate with the third-party server and continue the session.

FIG. 5 is sequence diagram of an example method for passing a session between smart devices. At stage 502, Smart Device A can receive a command from a user to execute a task. For example, a user can tell Smart Device A to play music, read emails, summarize calendar events, or give a weather forecast. Smart Device A can transcribe and interpret the voice command. In one example, the command can come from a user device. For example, the user can begin the task on the user device and, using an interface on the user device, transfer the task to Smart Device A.

At stage 504, Smart Device A can authenticate the user. In an example where the user speaks the command, Smart Device A can use voice recognition to verify the user. In one example, Smart Device A can include a machine learning model trained to recognize the voice of each registered user profile. When the user speaks a command, Smart Device A can record the command and apply the machine learning model to match it to one of the user profiles. In an example where the command comes from a user device, the user device and Smart Device A can exchange credentials, including a user ID of the user's profile. Likewise, the Smart Device A can rely on the user device to authenticate the user (such as with the server) when the user requests an enterprise-related task, such as reading email.

At stage 506, Smart Device A can initiate a session. A session can be a period in which a smart device is dedicated to executing tasks for a particular user profile. For example, some smart devices can allow for multiple user profiles. When a user issues a command for the smart device to execute a task, the smart device can verify the user and initiate a session under the user's profile. The session can include one or multiple tasks for the user profile.

At stage 508, Smart Device A can detect the user exiting its detection area. For example, Smart Device A can have person detection capabilities, such as with radar or video. The detection area can include the area within range of Smart Device A's detection capabilities. In one example, when the user goes undetected for a period or another smart device detects the user, Smart Device A can detect that the user exited the detection area.

At stage 510, Smart Device A can pause the session. In an example, Smart Device A can pause the task being executed in the session. For example, the task can include reading an email to the user. When Smart Device A detects the user exiting the detection area, Smart Device A can stop reading the email.

At stage 512, Smart Device A can notify the server of the user exit. In an example, this can include sending details about the session to the server. For example, the details can include the user profile for the session, the task being executed, and where the task was paused.

At stage 514, the server can send instructions to the user device to listen for a device ID. In an example, the user profile can be registered on both Smart Device A and the user device. In another example, the server can check the geolocation of all registered user devices for the user profile to determine which user devices are located near or on the same network as Smart Device A. The server can send instructions to all such registered user devices.

In one example, the user device can be a parent user device that is connected to a child user device. A child user device can be a user device that may not connect to a network, but connects directly to the parent user device, such as a smart watch or wireless headphones. In one example, the parent user device can forward the instructions to the child user device.

At stage 516, the user device can enable a listening mode. In one example, this can include activating a microphone to listen for audio. In another example, the instructions can cause the user device to listen for audio at a certain frequency, such as ultrasound or infrasound frequencies. In an example, listening mode can include opening a channel, or activating a receiving mode, for BLE or WI-FI.

At stage 518, Smart Device B can detect a user enter its detection area. For example, Smart Device B can have person detection capabilities like Smart Device A. In one example, Smart Device B can include a motion sensor that, when tripped, triggers Smart Device B to activate a person detection capability. In another example, Smart Device A and Smart Device B can be connected to the same network. When the user exits the detection are of Smart Device A, Smart Device A can broadcast a notification to other smart devices on the network. Upon receiving the notification, Smart Device B can activate its person detection capabilities.

At stage 520, Smart Device B can broadcast its device ID. In an example, Smart Device B can do this in response to detecting the user. Smart Device B can broadcast the device ID using one or multiple transmission methods. Some examples can include audio, BLE, and over a network. In one example where Smart Device B broadcasts its device ID using audio, Smart Device B can also broadcast a predetermined series of tones or sound pulses that the user device can be configured to identify so that the user device can recognize where the device ID starts and stops in the broadcast.

At stage 522, the user device can receive the device ID. In one example, the device ID can be broadcast using audio, which the user device can record using a microphone. In another example, the user device and Smart Device B can connect via BLE or WI-FI and Smart Device B can send the device ID directly to the user device.

At stage 524, the user device can send the device ID to the server. In an example, the user device can authenticate with the server before sending the device ID. Authenticating with the server can provide the server with the user ID of the user's profile.

At stage 526, the server can send a credential to the user device. In an example, the server can receive the user ID and device ID from the user device. The server can verify that the device ID of Smart Device B is registered to the user ID. After verifying, the server can generate a credential for Smart Device B to use to authenticate and continue the session. In one example, the credential can be an OTP. In one example, the server can also send the session details to the user device.

At stage 528, the user device can send the credential to Smart Device B. In one example, the user device can also send the session details.

At stage 530, Smart Device B can authenticate with the credential. In one example, authentication can include authenticating with the server. In another example, the server can send the credential to a server associated with the task being executed in the session. Smart Device B can authenticate with the task server using the credential. Smart Device B can also provide the credential to the task server in an example.

At stage 532, Smart Device B can continue the session. In an example where Smart Device B authenticates with the task server, the task server can begin providing information to the Smart Device B for executing the task. As an example, where the task is playing a song, the session details can indicate the song being played and at what point in the song the session was paused. The task server can begin streaming the song to Smart Device B from where the song was paused at Smart Device A. Similarly, when the paused task included reading an email, the email and the location where the reading was paused can be conveyed.

FIG. 6 is another sequence diagram of an example method for passing a session between smart devices. At stage 602, Smart Device A can receive a command from a user to execute a task. For example, a user can tell Smart Device A to play music, read emails, summarize calendar events, or give a weather forecast. Smart Device A can transcribe and interpret the voice command. In one example, the command can come from a user device. For example, the user can begin the task on the user device and, using an interface on the user device, transfer the task to Smart Device A.

At stage 604, Smart Device A can authenticate the user. In an example where the user speaks the command, Smart Device A can use voice recognition to verify the user. In one example, Smart Device A can include a machine learning model trained to recognize the voice of each registered user profile. When the user speaks a command, Smart Device A can record the command and apply the machine learning model to match it to one of the user profiles. In an example where the command comes from a user device, the user device and Smart Device A can exchange credentials, including a user ID of the user's profile.

At stage 606, Smart Device A can initiate a session. A session can be a period in which a smart device is dedicated to executing tasks for a particular user profile. For example, some smart devices can allow for multiple user profiles. When a user issues a command for the smart device to execute a task, the smart device can verify the user and initiate a session under the user's profile. The session can include one or multiple tasks for the user profile.

At stage 608, Smart Device A can detect the user exiting its detection area. For example, Smart Device A can have person detection capabilities, such as with radar or video. The detection area can include the area within range of Smart Device A's detection capabilities.

At stage 610, Smart Device A can notify the server of the user exit. In an example, this can include sending details about the session to the server. For example, the details can include the user profile for the session, the task being executed, and where the task was paused. In one example, Smart Device A can continue executing the task for a predetermined amount of time after the user exits. If the user does not return or if another smart device continues the session, Smart Device A can stop executing the task.

At stage 612, the server can send instructions to the user device to listen for a device ID. In an example, the user profile can be registered on both Smart Device A and the user device. In another example, the server can check the geolocation of all registered user devices for the user profile to determine which user devices are located near or on the same network as Smart Device A. The server can send instructions to all such registered user devices.

In one example, the user device can be a parent user device that is connected to a child user device. A child user device can be a user device that may not connect to a network, but connects directly to the parent user device, such as a smart watch or wireless headphones. In one example, the parent user device can forward the instructions to the child user device.

At stage 614, the user device can enable a listening mode. In one example, this can include activating a microphone to listen for audio. In another example, the instructions can cause the user device to listen for audio at a certain frequency, such as ultrasound or infrasound frequencies. In an example, listening mode can include opening a channel, or activating a receiving mode, for BLE or WI-FI.

At stage 616, Smart Device B can detect a user enter its detection area. For example, Smart Device B can have person detection capabilities like Smart Device A. In one example, Smart Device B can include a motion sensor that, when tripped, triggers Smart Device B to activate a person detection capability. In another example, Smart Device A and Smart Device B can be connected to the same network. When the user exits the detection are of Smart Device A, Smart Device A can broadcast a notification to other smart devices on the network. Upon receiving the notification, Smart Device B can activate its person detection capabilities.

At stage 618, Smart Device B can broadcast its device ID. In an example, Smart Device B can do this in response to detecting the user. Smart Device B can broadcast the device ID using one or multiple transmission methods. Some examples can include audio, BLE, and over a network. In one example where Smart Device B broadcasts its device ID using audio, Smart Device B can also broadcast a predetermined series of tones or sound pulses that the user device can be configured to identify so that the user device can recognize where the device ID starts and stops in the broadcast.

At stage 620, Smart Device B can receive the device ID. In one example, the device ID can be broadcast using audio, which the user device can record using a microphone. In another example, the user device and Smart Device B can connect via BLE or WI-FI and Smart Device B can send the device ID directly to the user device.

At stage 622, Smart Device B and the user device can exchange credentials. In one example, the credentials can include device IDs. Smart Device B can check with the server to verify that the device ID of the user device is registered for the user ID. This can help verify that the user that entered the detection area of Smart Device B is the same user that left the detection are of Smart Device A.

At stage 624, Smart Device B can exchange session details with Smart Device A. In an example, where Smart Devices A and B are on the same network, they can communicate directly to exchange session details. In another example, Smart Device A can send the session details to the server, and Smart Device B can contact the server to retrieve the session details.

At stage 626, Smart Device B can continue the session. In an example, Smart Device B can contact a server for the session task. Smart Device B can provide the session details, and the task server can begin sending data to Smart Device B for executing the session. In one example, Smart Device B can communicate with Smart Device A so that Smart Device A stops executing the task and Smart Device B begins immediately or soon thereafter.

In some examples, the methods described in FIGS. 5 and 6 above can both be executed on smart devices to transfer a session. For example, the method used to transfer a session can depend on the application executing the task or a security level of the task. As an example, where a task includes potentially sensitive data, such as private emails or messages from an enterprise account, the session can be transferred using the method described in FIG. 5, which includes extra security measures and Smart Device A pausing the session when the user leaves its detection area. Where a task does not include potentially sensitive data, such as playing a song, the session can be transferred using the method described in FIG. 6 so that the task can be transferred with minimal interruption.

FIG. 7 is an illustration of an example system for passing a session between smart devices. A Smart Device A 710 and a Smart Device B 720 can be connected to a network 140. Smart Devices A 710 and B 720 can be electronic devices that are context aware and can autonomously perform certain functions with or without direct user input. Context aware can mean that the device can gather information about its environment and adapt its behaviors accordingly. As some examples, the Smart Devices A 710 and B 720 can be smart speakers or smart displays, such as GOOGLE HOME, GOOGLE NEST HUB, AMAZON ECHO, AMAZON ECHO SHOW. Smart Devices A, B can also have detection capabilities. As some examples, the Smart Devices A 710 and B 720 can use motion sensors, a video camera, or radar to detect the presence of a person in its vicinity. The area in which Smart Devices A 710 and B 720 can detect a person can be detection areas A 712 and B 722, respectively.

The network 740 can be a group of computing devices that share common communication protocols over digital interconnections for exchanging data. In some examples, the network 740 can include a local area network ("LAN") or a wireless area network ("WAN"). In one example, the network 740 can be so broad as to include any devices connected to the Internet.

In an example, Smart Device A 710 can be a smart device that a user initiates a session with. A session can be a period in which a smart device is dedicated to executing tasks for a particular user profile. Smart Device A can track the user as it executes the commanded task. If the user exits the detection area A 712, Smart Devices A 710 can notify a server 750.

The server 750 can be a single server or a group of servers, including multiple servers implemented virtually across multiple computing platforms. The server 750 can be responsible for managing session transfers between smart devices. For example, upon receiving a notification of the user exiting detection area A 712, the server can send instructions to a user device 730 to listen for a device ID of another smart device. In one example, the user device 730 can be registered to a user profile, such as an enterprise profile in a UEM system. Smart Devices A 710 and B 720 can also be registered to the user profile. The notification from Smart Device A 710 can include a user ID for the user profile. The server 750 can send the listening instructions to the user device 730 based on the user device 730 being a user device registered to the user profile.

Smart Device B 720 can be configured to detect motion in detection area B 722. This can include detecting a person, such as the user. Upon detecting a person, Smart Device B 722 can broadcast its device ID so that the user device 730 can receive it. As some examples, Smart Device B 722 can broadcast its device ID as an audio broadcast, BLE transmission, or WI-FI transmission.

The user device 730 can be one or more processor-based devices, such as a cell phone, tablet, or smart watch. Upon receiving listening instructions from the server 750, the user device 730 can activate a listening mode to listen for a device ID from another smart device, such as Smart Device B 720. As some examples, the user device 730 can enable a microphone to listen to an audio broadcast of a device ID, open the user device 730 to receive a BLE connection or data request, or open the user device 730 to receive a device ID via WI-FI.

In one example, after receiving the device ID of Smart Device B 720, the user device 730 can send it to the server 750. The server 750 can receive the device ID, verify that Smart Device B 720 is registered to the user profile, and provide a credential to the user device 730. The user device 730 can forward the credential to Smart Device B 720. In one example, the system can include a second server related to the task executing in the session. Smart Device B 720 can use the credential to authenticate with the task server can continue the session.

In another example, after receiving the device ID of Smart Device B 720, the user device 730 can exchange credentials with Smart Device B 720 to verify to Smart Device B 720 that the detected person is the user that exited detection area A 712. Upon verifying the presence of the user, Smart Device B 720 can communicate with Smart Device A 710 to exchange session details and execute the session transfer. Smart Device A 710 can stop executing the task and Smart Device B 720 can begin doing so.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for transferring a session between first and second smart devices, comprising:
   receiving, at a server, a notification from the first smart device that a user exited a first detection area, the first smart device having paused a session that was executing while the user was within the first detection area in response to the first smart device detecting that the user exited the first detection area;
   receiving, at the server from the first smart device, first observed physical characteristics of the user;
   receiving, at the server from a user device, a device identifier corresponding to a second smart device, the user device having received the device identifier from the second smart device after entering a second detection area associated with the second smart device;
   verifying, at the server based on the device identifier, that the second smart device is authorized to continue the session;
   sending, to the user device, a credential for continuing the session;
   receiving, from the second smart device, the credential, the second smart device having received the credential from the user device;
   authenticating the credential;
   receiving, at the server from the second smart device, second observed physical characteristics of the user, wherein the first and second observed physical characteristics include an observed height and predicted weight of the user;
   verifying, at the server, that the first and second observed physical characteristics match; and
   based on the authentication and the first and second observed physical characteristics matching, providing, to the second smart device, instructions for continuing the session.

2. The method of claim 1, further comprising sending instructions to the user device to listen for the device identifier.

3. The method of claim 1, wherein the second smart device detects the user in the second detection area and broadcasts the device identifier.

4. The method of claim 3, wherein the second smart device broadcasts the device identifier as infrasound or ultrasound waves.

5. The method of claim 1, wherein the user device or the server sends the credential to a second server associated with content accessed in the session prior to continuing the session at the second smart device.

6. The method of claim 1, wherein the first smart device performs stages comprising:
 initializing the session in response to a user request;
 detecting that the user exited the first detection area, the first detection area being associated with the first smart device;
 pausing the session; and
 sending a notification to the server that the user exited the first detection area.

7. The method of claim 1, wherein a management application causes the first smart device to pause the session based on a determination that the session includes a broadcast of sensitive information.

8. A non-transitory, computer-readable medium containing instructions that, when executed by a hardware-based processor, performs stages for transferring a session between first and second smart devices, the stages comprising:
 receiving, at a server, a notification from the first smart device that a user exited a first detection area, the first smart device having paused a session that was executing while the user was within the first detection area in response to the first smart device detecting that the user exited the first detection area;
 receiving, at the server from the first smart device, first observed physical characteristics of the user;
 receiving, at the server from a user device, a device identifier corresponding to a second smart device, the user device having received the device identifier from the second smart device after entering a second detection area associated with the second smart device;
 verifying, at the server based on the device identifier, that the second smart device is authorized to continue the session;
 sending, to the user device, a credential for continuing the session;
 receiving, from the second smart device, the credential, the second smart device having received the credential from the user device;
 authenticating the credential;
 receiving, at the server from the second smart device, second observed physical characteristics of the user, wherein the first and second observed physical characteristics include an observed height and predicted weight of the user;
 verifying, at the server, that the first and second observed physical characteristics match; and
 based on the authentication and the first and second observed physical characteristics matching, providing, to the second smart device, instructions for continuing the session.

9. The non-transitory, computer-readable medium of claim 8, the stages further comprising sending instructions to the user device to listen for the device identifier.

10. The non-transitory, computer-readable medium of claim 8, wherein the second smart device detects the user in the second detection area and broadcasts the device identifier.

11. The non-transitory, computer-readable medium of claim 10, wherein the second smart device broadcasts the device identifier as infra sound or ultrasound waves.

12. The non-transitory, computer-readable medium of claim 8, wherein the user device or the server sends the credential to a second server associated with content accessed in the session prior to continuing the session at the second smart device.

13. The non-transitory, computer-readable medium of claim 8, wherein the first smart device performs stages comprising:
 initializing the session in response to a user request;
 detecting that the user exited the first detection area, the first detection area being associated with the first smart device;
 pausing the session; and
 sending a notification to the server that the user exited the first detection area.

14. The non-transitory, computer-readable medium of claim 8, wherein a management application causes the first smart device to pause the session based on a determination that the session includes a broadcast of sensitive information.

15. A system for transferring a session between first and second smart devices, comprising:
 a memory storage including a non-transitory, computer-readable medium comprising instructions; and
 a computing device including a hardware-based processor that executes the instructions to carry out stages comprising:
  receiving, at a server, a notification from the first smart device that a user exited a first detection area, the first smart device having paused a session that was executing while the user was within the first detection area in response to the first smart device detecting that the user exited the first detection area;
  receiving, at the server from the first smart device, first observed physical characteristics of the user;
  receiving, at the server from a user device, a device identifier corresponding to a second smart device, the user device having received the device identifier from the second smart device after entering a second detection area associated with the second smart device;
  verifying, at the server based on the device identifier, that the second smart device is authorized to continue the session;
  sending, to the user device, a credential for continuing the session;
  receiving, from the second smart device, the credential, the second smart device having received the credential from the user device;
  authenticating the credential;
  receiving, at the server from the second smart device, second observed physical characteristics of the user, wherein the first and second observed physical characteristics include an observed height and a predicted weight of the user;
  verifying, at the server, that the first and second observed physical characteristics match; and
  based on the authentication and the first and second observed physical characteristics matching, providing, to the second smart device, instructions for continuing the session.

16. The system of claim 15, the stages further comprising sending instructions to the user device to listen for the device identifier.

17. The system of claim 15, wherein the second smart device detects the user in the second detection area and broadcasts the device identifier.

18. The system of claim 17, wherein the second smart device broadcasts the device identifier as infrasound or ultrasound waves.

19. The system of claim 15, wherein the user device or the server sends the credential to a second server associated with content accessed in the session prior to continuing the session at the second smart device.

20. The system of claim 15, wherein the first smart device performs stages comprising:
   initializing the session in response to a user request;
   detecting that the user exited the first detection area, the first detection area being associated with the first smart device;
   pausing the session; and
   sending a notification to the server that the user exited the first detection area.

* * * * *